April 20, 1943.  J. W. HAMMOND  2,316,953
POTATO DRESSING APPARATUS
Filed Nov. 1, 1941

INVENTOR.
Joseph W. Hammond
BY
ATTORNEY.

Patented Apr. 20, 1943

2,316,953

UNITED STATES PATENT OFFICE 2,316,953

POTATO DRESSING APPARATUS

Joseph W. Hammond, Wolcott, N. Y., assignor to Olney & Carpenter, Inc., Wolcott, N. Y., a corporation of New York Application November 1, 1941, Serial No. 417,542

1 Claim. (Cl. 146—106)

The object of this invention is to provide an apparatus or device containing a rotary cutter that will remove the peel or skin from the eye of a potato and can also be used to cut blemishes from the sides of potatoes that are spread over a considerable area of the surface and do not extend deeply into the potato.

Another object of the invention is to have the cutter and potato in full view of the operator at all times while the potato is being processed by the cutter.

Another object of the invention is to make the rotary cutter with radial cutting blades of a certain length having edges that extend parallel to the axis of the cutter, the ends of the blades tapering to a point on the axis of the cutter.

Another object of the invention is to drive the cutter with an electric motor, the whole being assembled in connection with a trough along which the potatoes must pass, the motor being mounted on the outside of the trough, and the cutter being extended through a hole in the side of the trough into the trough.

Another object of the invention is to shape the cutter so that it will effectively process the potato without throwing the waste matter up into the face of the operator, thus making a shield unnecessary.

These and other objects of the invention will be illustrated in the drawing, described in the specification, and pointed out in the claim at the end thereof.

In the drawing.

In the drawing like reference numerals indicate like parts.

Figure 4:
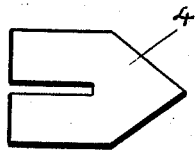
Figures 4 and 5 are detail views of the cutting blades before they are assembled, showing how each blade is cut away so that one blade can be nested into the other when assembled.
Figure 5:
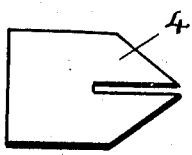
Figure 7:
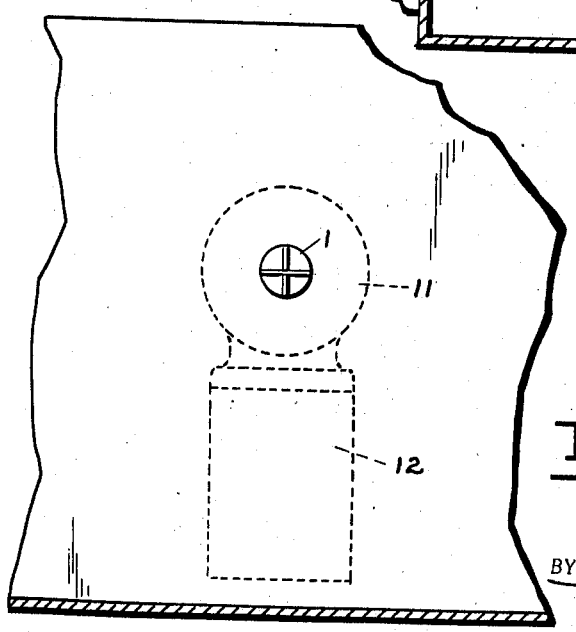
Figure 7 is an end elevation of the cutter looking at it from the right in Figure 6.

In the drawing reference numeral 1 indicates a cylindrical base having a hole 2 extending through it along the axis thereof, which hole is indicated by dotted lines. Across the forward end this cylindrical base is grooved with four radial grooves 3, 3 cut therein. Cutting knives or blades 4, 4 are formed, which blades are shown in detail in Figures 4 and 5. These blades are beveled on the ends with a bevel of about 40 degrees, or thereabouts. The blades, when assembled on the base, nest into each other along the axial line, each blade being cut away on its axial line for this purpose so that each blade will partly straddle the other blade so that when assembled the points of the two blades come together with the center line of the blades in line with the axis of the cylinder. When assembled the two blades have four cutting edges. The butt ends of the blades engage in the grooves 3, 3 cut across the end of the cylinder. When assembled in this way the parts are all fastened together by brazing or any other suitable manner.

Figure 1:
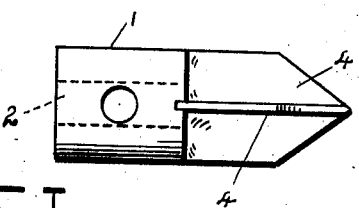
Figure 1 is a side elevation of my improved cutter.
Figure 2:
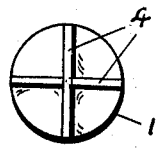
Figure 2 is an end elevation of the cutter.
Figure 3:
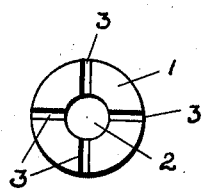
Figure 3 is an end elevation of the base of the cutter with the cutting blades removed.
Figure 6:
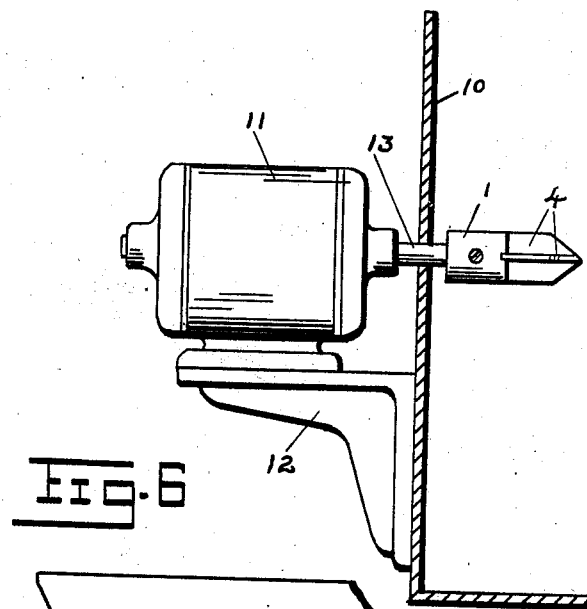
Figure 6 is a sectional view of the trough with the cutter and motor mounted thereon, the trough being partly broken away.

This cutter is mounted on a shaft 13 and is driven by a small electric motor 11, at a preferred speed of about 1,200 R. P. M. The assembly is preferably mounted on the trough 10, as indicated in Figure 6, the motor 11 being mounted on a bracket 12 fastened to the outside of the trough, the shaft 13, extending through the side of the trough and carrying the cutter 1 on the inside thereof. The cutter is revolved at any suitable speed short of throwing the waste matter up by centrifugal force. This makes a guard unnecessary, the deep long recesses between the blades permitting the pulp to accumulate until it drops off in large masses rather than being thrown off in small chips. The operator sits by the trough and picks up a potato from the bottom of the trough, which potato has previously been peeled. She can rest her wrist on the edge of the trough while she presses the eye of the potato against the point of the cutter. By doing so all objectionable matter is removed from the pit containing the eye. If the surface of the potato contains a blemish that is more or less skin deep, that part of the potato is pressed against the straight edges of the cutter that run parallel to the axis, which quickly removes all of such objectionable matter from the potato, and this can be done over a considerable area without cutting deep into the potato. In this way both the point of the cutter and the beveled edges and the sides of the cutter parallel to the axis are used for the purpose of dressing the potato, preparatory to the use of the potato as food. In this way the operator can dress potatoes one at a time in rapid succession, without much waste of the meat of the potato.

While the assembly is shown mounted on the side of a trough, it will be understood that it can rest on a block, or on a table, or be mounted otherwise in any suitable manner, and where the trough is used cutters can be mounted for operation on opposite sides of the trough.

It is also obvious that the cutter can be used for dressing other vegetables preparatory to cooking or canning.

I claim:

In a potato dressing apparatus the combination of a cylindrical base, two thin cutting blades extending out from said base, the edges of which cutting blades extend forward parallel to the axis of the base, each of said cutting blades being cut away partly along the middle line thereof so that the one cutting blade can nest into the other cutting blade and stand at right angles thereto, said blades tapering on the forward end to a point in line with the axis of the cylindrical base, grooves extending at right angles across the face of the base into which the rear edges of the blades fit, the blades and base being rigidly fastened together, a shaft on which said base is mounted and with which the base and cutting blades rotate.

JOSEPH W. HAMMOND.